(No Model.)
R. F. YANCEY.
CHURN.
No. 599,212. Patented Feb. 15, 1898.
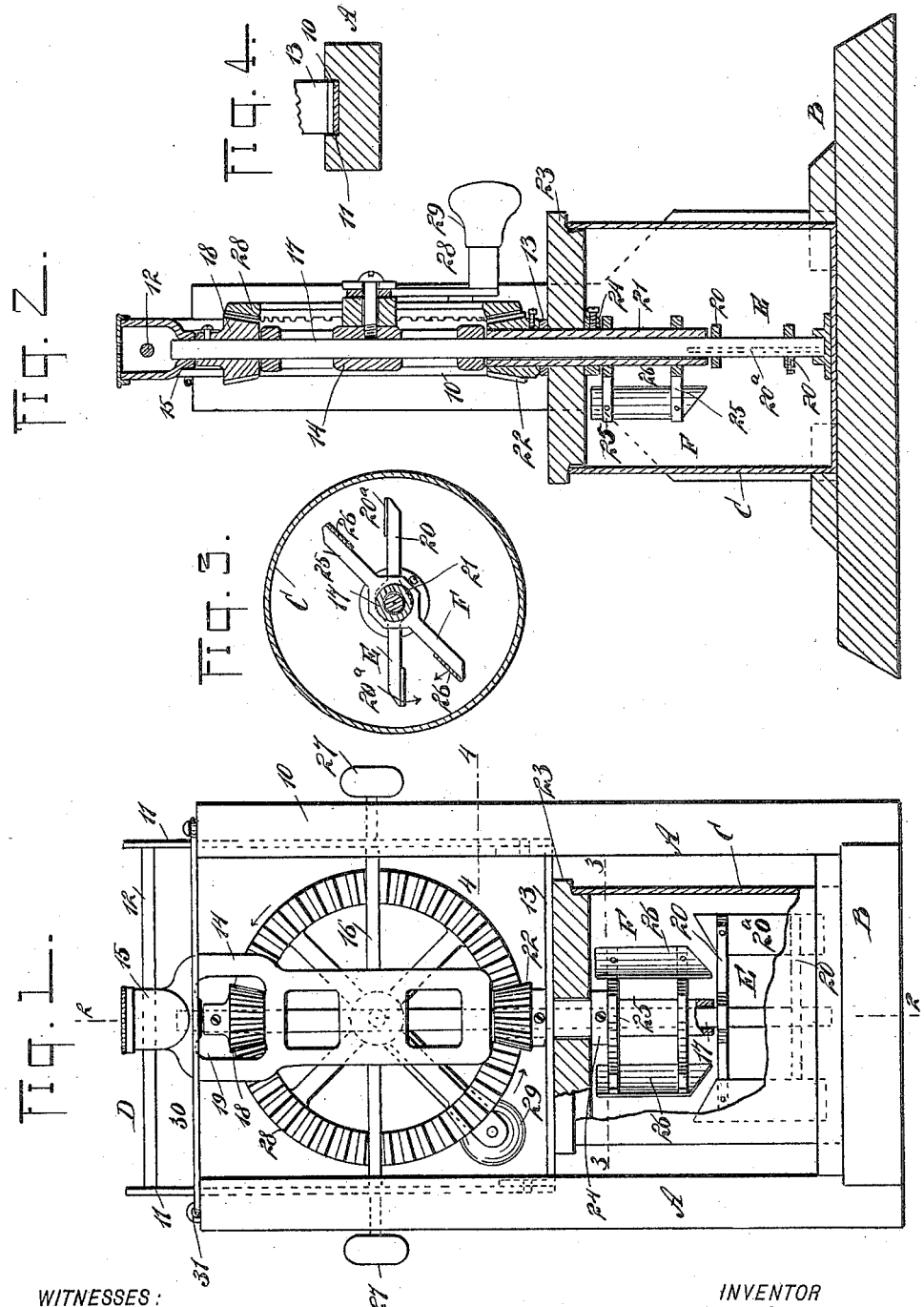
WITNESSES:
H. Hellyer
J. Fred Acker
INVENTOR
R. F. Yancey
BY
ATTORNEYS.

UNITED STATES PATENT OFFICE.

ROBERT F. YANCEY, OF AKARD, MISSOURI.

CHURN.

SPECIFICATION forming part of Letters Patent No. 599,212, dated February 15, 1898.

Application filed May 25, 1897. Serial No. 638,021. (No model.)

*To all whom it may concern:*

Be it known that I, ROBERT F. YANCEY, of Akard, in the county of Cedar and State of Missouri, have invented a new and Improved Churn, of which the following is a full, clear, and exact description.

The object of the invention is to construct a churn which will be durable, simple, and economic and which will comprise but few parts.

Another object of the invention is to provide dashers for the churn, which may be revolved in opposite directions, and to so construct the dashers that they, together with the shafts upon which they are mounted, may be conveniently and speedily cleaned.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a side elevation of the churn, a portion of the receptacle in which the milk is placed being broken away and in section. Fig. 2 is a vertical section on the line 2 2 of Fig. 1. Fig. 3 is a horizontal section on the line 3 3 of Fig. 1; and Fig. 4 is a detail view, being a section on the line 4 4 of Fig. 1.

Uprights A are connected by a base B, and in the base a socket is formed to receive the bottom portion of a receptacle C, in which the milk to be churned is placed. The uprights and the base form the main or stationary frame of the churn. In the opposing faces of the standards A vertical grooves or slideways 10 are made, which extend from the top to a point near the center of the standards. A movable frame D is held to slide in the grooves 10 of the standards, the said frame comprising side pieces 11, an upper cross-bar 12, and a lower cross-bar 13. A hanger 14 is supported by this frame, being located at about the central portion of the frame, and at the top of the hanger an oil-cup 15 is preferably formed, to which the upper cross-bar 12 is attached. The hanger is further supported at or near its center by means of an intermediate cross-bar 16.

A shaft 17 is journaled in the hanger 14, the upper end of the shaft extending into the oil-cup 15, and the lower end of the shaft extends some distance below the bottom of the frame D. Near the upper end of the shaft 17 a pinion 18 is attached to said shaft, being located, preferably, in an opening 19, made in the hanger, and said pinion is also preferably beveled.

At the lower end of the shaft a dasher E is secured, the said dasher consisting of two cross bars or arms 20, which are attached at or near their central portions to the said shaft through the medium of set-screws or their equivalents, and upright blades or paddles 20ª, which connect the end portions of the cross-bars. The upper end portion of each blade or paddle is preferably inclined, as shown in Fig. 1.

A tubular shaft 21 is held to turn around the lower portion of the shaft 17 above the dasher E. At the upper end of the tubular shaft a beveled pinion 22 is attached, which rests upon the lower cross-bar 13 of the frame D. The cover 23 for the receptacle C is loosely mounted on the tubular shaft immediately below the frame D and is held in place by a collar 24, attached to the tubular shaft below said cover, as shown in Fig. 2. A dasher F is carried by the lower portion of the tubular shaft, and this dasher is constructed similarly to the dasher E, consisting of cross bars or arms 25 and blades or paddles 26, connecting said cross-bars. The lower ends of the blades or paddles of the upper dasher are inclined in such manner that they may be readily passed over, yet close to, the inclined upper surfaces of the blades of the lower dasher. A beveled gear 28 is held to turn on a shaft carried by the hanger 14, and this beveled gear engages with both of the pinions 18 and 22, turning the pinions in reverse directions, consequently causing the dashers E and F to be turned simultaneously in opposite directions. The gear 28 is preferably revolved through the medium of an attached handle 29.

The frame D, and consequently the dashers E and F and the cover of the receptacle C, may be carried upward, so as to take the dashers out of the receptacle C and the cover from over the receptacle. Set-screws 27 are provided to hold the frame D in any position in which it may be placed. These set-screws pass through the standards A and engage with the side bars 11 of the said frame. When the frame D is to be taken out entirely, a hook 30, which is pivoted to one standard, is disengaged from an eye carried by the opposing standard. The blades or paddles of each dasher are at opposite sides of the arms carrying them, as shown in Fig. 3.

Having thus described my invention, I claim as new and desire to secure by Letters Patent—

In a churn, the combination, with uprights, a frame held to slide in said uprights, a hanger carried by the frame, a shaft journaled in said hanger and provided with a beveled pinion, and a tubular shaft held to turn around the shaft journaled in the hanger, the tubular shaft being likewise provided with a beveled pinion, of a driving-gear engaging with both pinions, a cover carried by and loosely mounted upon one of the shafts, and a dasher attached to each shaft, each dasher consisting of cross-bars and blades or paddles connecting them, the said dashers being located near together, having the opposing ends of their blades or paddles beveled, and means, substantially as described, for holding the frame in adjustable position between the standards.

ROBERT F. YANCEY.

Witnesses:
 THOS. L. NELSON,
 WM. C. HASTIN.